United States Patent
Uchiike

(10) Patent No.: US 7,906,951 B2
(45) Date of Patent: Mar. 15, 2011

(54) SWITCHING REGULATOR HAVING REVERSE CURRENT DETECTOR

(75) Inventor: Takeshi Uchiike, Kanagawa (JP)

(73) Assignee: RENESAS Electronics Corporation, Kawasaki-shi, Kanagawa (JP)

( * ) Notice: Subject to any disclaimer, the term of this patent is extended or adjusted under 35 U.S.C. 154(b) by 328 days.

(21) Appl. No.: 12/149,911

(22) Filed: May 9, 2008

(65) Prior Publication Data
US 2008/0290854 A1    Nov. 27, 2008

(30) Foreign Application Priority Data
May 23, 2007  (JP) ................................. 2007-136986

(51) Int. Cl.
    *G05F 1/00*    (2006.01)
(52) U.S. Cl. ...................................................... 323/284
(58) Field of Classification Search ............ 323/284
    See application file for complete search history.

(56) References Cited

U.S. PATENT DOCUMENTS
2006/0113980 A1*  6/2006  Yoshida .................. 323/282

FOREIGN PATENT DOCUMENTS
| JP | 2006-333689 | 12/2006 |
| JP | 2007-6555 | 1/2007 |
| JP | 2007-20315 | 1/2007 |

* cited by examiner

Primary Examiner — Bao Q Vu
Assistant Examiner — Jue Zhang
(74) Attorney, Agent, or Firm — McGinn IP Law Group, PLLC

(57) ABSTRACT

A switching regulator includes first and second transistors, which are provided in series between power sources respectively having first and second potentials, and which convert a direct current voltage of a potential difference between the first and the second potentials into an alternating current voltage, and a control circuit. The control circuit includes a comparator which compares the alternating current voltage and a threshold voltage in a period when the second transistor is to be on, and receives a predetermined voltage, at least immediately before the period in which the second transistor is to be on, the predetermined voltage being farther than a midpoint potential of the first and second potentials from the threshold voltage. The control circuit performs control such that the second transistor becomes turned off, when the comparator judges that the alternating current voltage has exceeded the threshold voltage toward the midpoint potential direction, in the period when the second transistor is to be on.

9 Claims, 8 Drawing Sheets

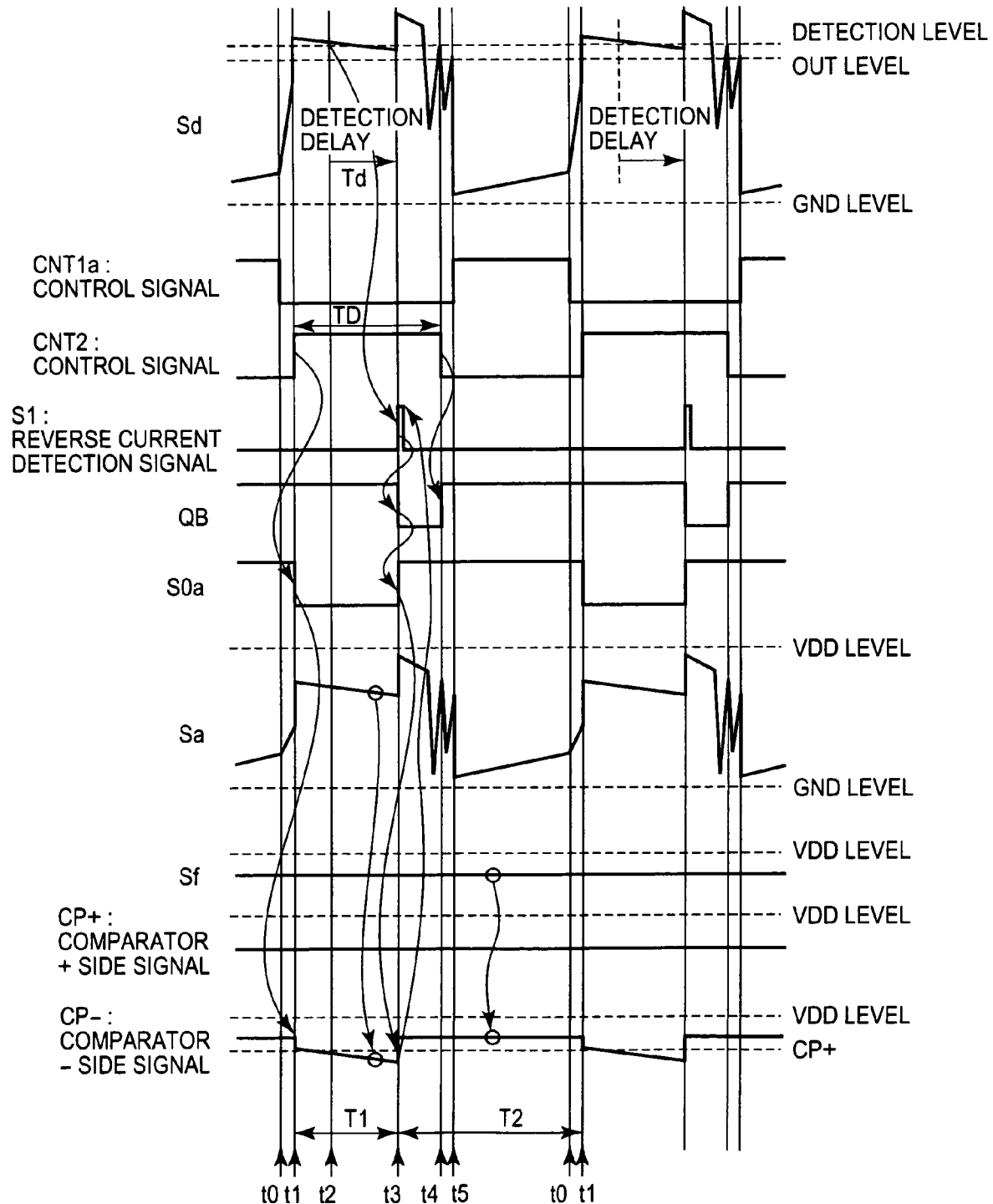

SWITCHING REGULATOR HAVING REVERSE CURRENT DETECTOR

BACKGROUND OF THE INVENTION

1. Field of the Invention

The present invention relates to a switching regulator, and particularly to a synchronous rectification switching regulator.

2. Description of Related Art

Power supply voltage to be applied to a semiconductor device has been decreasing with the reduction in size of semiconductor devices. To supply power to such semiconductor devices, synchronous rectification switching regulators are often used. A switching regulator steps down or steps up voltage from a power supply, such as a battery, to apply the resultant voltage, as power, to a semiconductor device. When the load current decreases in such a switching regulator under light load conditions, the direction of the current flowing through an output inductor is inverted, so that the current flows from the output inductor to ground through a synchronous rectifier transistor, in some cases. Since the current is supplied from an output capacitor without being supplied to the load, the power is wasted. To solve this, Patent documents 1, 2 and 3 each disclose a technique to detect an inversion of the direction of current flowing through an inductor under light load conditions, and to perform, upon detection, control such that a synchronous rectifier transistor can be turned off.

For example, the DC-DC converter described in Patent document 1 includes: a first potential; a pair of power transistors, which are disposed in series between the first potential and a second potential, the second potential being lower than the first potential, and which convert direct current voltage of the potential difference between the first and second potentials into alternating current voltage; detection means, which outputs a detection signal when the alternating current voltage is lower than the second potential by a predetermined value; and a control circuit, which is provided for controlling the pair of power transistors, and which turns off the power transistor (a synchronous rectifier transistor) disposed on the second potential side, in response to the detection signal.

In the above DC-DC converter, the detection means outputs a detection signal when the alternating current voltage is lower than the second potential by the predetermined value. Thus, a detection signal is outputted before the alternating current voltage becomes equal to the second potential. This makes it possible to compensate for the effect of delay time caused by the detection means, thereby to highly accurately turn off the power transistor (a synchronous rectifier transistor) around an operation range in which the alternating current becomes 0.

[Patent document 1] Japanese Patent Laid Open Application No. 2006-333689
[Patent document 2] Japanese Patent Laid Open Application No. 2007-20315
[Patent document 3] Japanese Patent Laid Open Application No. 2007-6555

As the above detection means, a comparator is generally used. A comparator compares the voltages of a non-inverting (+) input terminal and an inverting (−) input terminal, and sets an output (OUT) at high level when the voltage of the + input terminal (CP+) is higher than the voltage of the − input terminal (CP−) while setting an output (OUT) at low level when the voltage of the + input terminal (CP+) is lower than the voltage of the − input terminal (CP−).

FIG. 8 is charts schematically showing operation waveforms of the comparator. As shown in FIG. 8 (A), when the voltage of the + input terminal (CP+) decreases to a voltage lower than the voltage of the − input terminal (CP−), the output (OUT) is switched from high level to low level with a delay of a time period Td1. By contrast, when the voltage (CP+) increases to a voltage higher than the voltage (CP−), the output (OUT) is switched from low level to high level with a delay of a time period Td2.

Assume that the voltage (CP+) decreases to a voltage lower than the voltage (CP−) by $\Delta V$. When $\Delta V$ is small, the time periods Td1 and Td2 increase as shown in FIG. 8 (B), in other words, reaction of comparison operation is slower. Moreover, when $\Delta V$ is even smaller, the output (OUT) is kept at high level without being switched to low level, as shown in FIG. 8 (C). Thus, the comparator has characteristics of not outputting any comparison result of comparison operation in a case where a difference between levels of input comparison signals is extremely small and where the duration time of such condition is shorter than a time duration called dead zone width.

When load current decreases under light load conditions, the above-mentioned alternating current voltage becomes slightly lower than the second potential by a predetermined value. In this case, there is a possibility that the comparator does not output any comparison result because of the above-described characteristics of the comparator, so that the synchronous rectifier transistor is not turned off. Accordingly, the comparator cannot carry out comparison operation with high accuracy under light load conditions and hence the synchronous rectifier transistor is not turned off. This may possibly reduce efficiency in power conversion under light load conditions.

SUMMARY OF THE INVENTION

A switching regulator according to an aspect of the present invention is a switching regulator. The switching regulator includes first and second transistors, which are provided in series between power sources respectively having first and second potentials, and which convert a direct current voltage of a potential difference between the first and the second potentials into an alternating current voltage; and a control circuit.

The control circuit includes a comparator which compares the alternating current voltage and a threshold voltage in a period when the second transistor is to be on, and receives a predetermined voltage, in at least immediately before the period in which the second transistor is to be on, the predetermined voltage being farther than a midpoint potential of the first and second potentials from the threshold voltage.

The control circuit performs control such that the second transistor becomes turned off, when the comparator judges that the alternating current voltage has exceeded the threshold voltage toward the midpoint potential direction, in the period when the second transistor is to be on.

According to the present invention, the predetermined voltage, instead of the alternating current voltage, is applied to the comparison input terminal of the comparator at least immediately before the period in which the first transistor is to be on. Such configuration makes it possible to perform control such that the first transistor can be certainly turned off even in a case where the comparator cannot carry out comparison operation with high accuracy under light load conditions. As a result, efficiency in power conversion under light load conditions can be improved.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 7 is a timing chart showing waveforms of the units of the switching regulator according to the second example of the present invention.

DETAILED DESCRIPTION OF THE EXEMPLARY EMBODIMENTS

Figure 1:
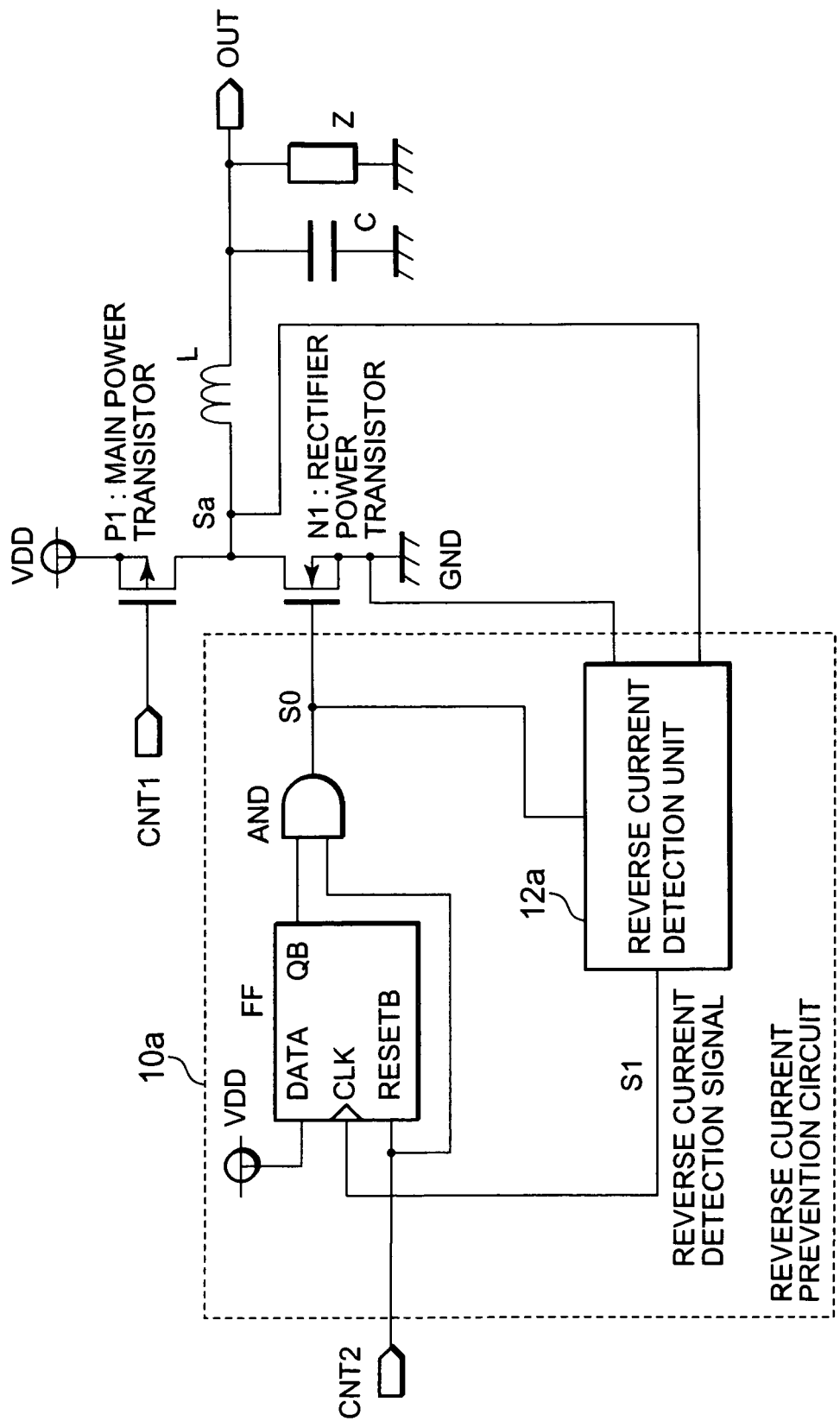
FIG. 1 is a block diagram showing a configuration of a switching regulator according to a first example of the present invention.

A switching regulator according to an exemplary embodiment of the present invention is a synchronous rectification switching regulator that includes a switching transistor, a synchronous rectifier transistor, and a control circuit. The switching transistor and the synchronous rectifier transistor are provided in series between power sources respectively having first and second potentials, and convert direct current voltage of the potential difference between the first and the second potentials into alternating current voltage. The control circuit includes a comparator for comparing the alternating current voltage with a threshold voltage in a period when the synchronous rectifier transistor is to be on. The control circuit applies a predetermined voltage, instead of the alternating current voltage, to a comparison input terminal of the comparator at least immediately before a period in which the synchronous rectifier transistor is to be on, the predetermined voltage being farther than the midpoint potential of the first and second potentials from the threshold voltage. Moreover, the control circuit performs control such that the synchronous rectifier transistor can be turned off, when the comparator judges that the alternating current voltage has exceeded the threshold voltage in the midpoint potential direction, in the period when the synchronous rectifier transistor is to be on.

Alternatively, the control circuit may switch, to the predetermined voltage, the alternating current voltage to be applied to the comparison input terminal of the comparator, and may perform control such that the thus-switched state can be maintained until immediately before the period in which the synchronous rectifier transistor is to be on, when the comparator judges that the alternating current voltage has exceeded the threshold voltage in the midpoint potential direction.

In addition, the comparator may compare the voltages of first and second input terminals, thereby outputting a reverse current detection signal indicating the comparison result. Moreover, the control circuit may further include a voltage generation circuit, a switching circuit and a logical circuit. The voltage generation circuit generates a first comparison voltage based on the alternating current voltage, and a second comparison voltage corresponding to the second potential, the second comparison voltage being the predetermined voltage, and also generates a threshold voltage corresponding to the second potential thereby applying the threshold voltage to the second comparison input terminal. The switching circuit which selects one of the first and second comparison voltages, and which then applies the selected voltage to the first comparison input terminal. The logical circuit outputs, to the gate of the synchronous rectifier transistor and the switching circuit, a switching signal for controlling the synchronous rectifier transistor. The synchronous rectifier transistor is turned on in response to a control signal indicating a period in which the synchronous rectifier transistor is to be on, and is turned off in response to the reverse current detection signal.

Furthermore, the voltage generation circuit may include a first resistance element, a first MOS transistor, a second MOS transistor, a third MOS transistor, and a current source circuit. The first MOS transistor applies the second potential to its drain, is connected to a first switching terminal of the switching circuit at its source through the first resistance element, and applies the alternating current voltage to its gate. The second MOS transistor applies the second potential to its drain and gate, and is connected to a second switching terminal of the switching circuit at its source. The third MOS transistor applies the second potential to its drain and the gate, and is connected to the second comparison input terminal of the comparator at its source. The current source circuit supplies current to the source of the first MOS transistor through the first resistance element, and also supplies current to the source of each of the second and third MOS transistors. Here, the current source circuit may supply each of the first and third MOS transistors with current larger than that to be supplied to the second MOS transistor, and may supply the first and third MOS transistors respectively with currents of the same amount.

Furthermore, the current source circuit may be constituted of first, second and third current mirror circuits, the first current mirror circuit using a second resistance element as a load. Here, the first, second and third current mirror circuits may supply current to the first, second and third MOS transistors, respectively.

Hereinbelow, this embodiment will be described in detail on the basis of examples with reference to the drawings.

Example 1

FIG. 1 is a block diagram showing a configuration of a switching regulator according to a first example of the present invention. In FIG. 1, the switching regulator includes a switching transistor (main power transistor) P1, a synchronous rectifier transistor (rectifier power transistor) N1, a reverse current prevention circuit 10a, an inductor L, and a capacitor C. The switching regulator steps down the voltage from a power source VDD to apply resultant voltage to a load Z.

The switching transistor P1 is connected to the power source VDD at its source, and is connected to one end of the inductor L at its drain. Moreover, the gate of the switching transistor P1 is provided with a pulse-width or pulse-density modulated control signal CNT1 for controlling output voltage to the load Z.

The synchronous rectifier transistor N1 is connected to ground at its source, and is connected to the one end of the inductor L at its drain. Moreover, the reverse current prevention circuit 10a is connected to the gate of the synchronous rectifier transistor N1. The reverse current prevention circuit 10a detects reverse current in the inductor L, and then performs control to turn on or off the synchronous rectifier transistor N1.

The switching transistor P1 and the synchronous rectifier transistor N1 convert the voltage from the power source VDD to the voltage of an alternating current signal Sa. The alternating current signal Sa is smoothed by the inductor L and the capacitor C, and is then provided, as direct current voltage, to the load Z connected to an output terminal OUT.

The reverse current prevention circuit 10a includes a reverse current detection unit 12a, a flip-flop circuit FF, and a 2 input AND circuit AND. The reverse current detection unit 12a receives inputs of the alternating current signal Sa and a control signal S0 for the gate of the synchronous rectifier transistor N1, and then outputs a reverse current detection signal S1 to a clock input terminal CLK of the flip-flop circuit FF. In the flip-flop circuit FF, a data input terminal DATA is connected to a power source VDD, a reset terminal RESETB receives an input of a control signal CNT2 synchronized with the control signal CTN1, and an output terminal QB is connected to one of the input terminals of the 2 input AND circuit AND. The 2 input AND circuit AND receives an input of the control signal CNT2 at the other input terminal, and then outputs the control signal S0 from an output terminal to the gate of the synchronous rectifier transistor N1 and the reverse current detection unit 12a.

Figure 2:
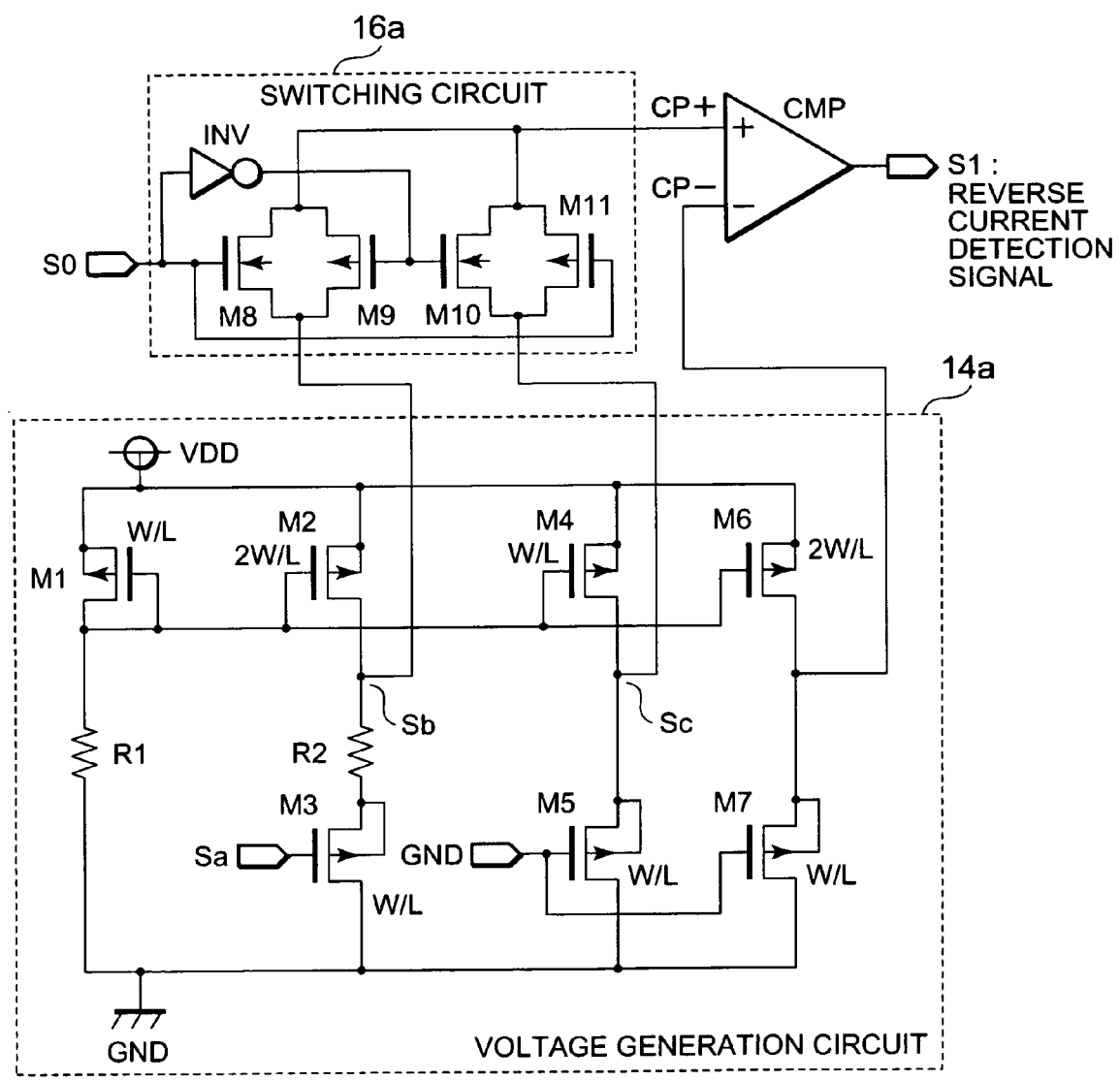
FIG. 2 is a circuit diagram showing an example of a reverse current detection unit according to the first example of the present invention.

Next, the reverse current detection unit 12a will be described in detail. FIG. 2 is a circuit diagram showing an example of the reverse current detection unit 12a. The reverse current detection unit 12a includes a comparator CMP, a voltage generation circuit 14a, and a switching circuit 16a.

The voltage generation circuit 14a includes Pch transistors M1 to M7, and resistance elements R1 and R2. In the voltage generation circuit 14a, the sizes (W/L) of the Pch transistors M1, M3 to M5, and M7 are identical, while the size (2W/L) of each of the Pch transistors M2 and M6 is twice as large as that of the Pch transistors M1, M3 to M5, and M7.

The Pch transistor M1 is connected to the power source VDD at its source, and to ground at its diode-connected drain through the resistance element R1. The Pch transistor M2 forms a current mirror circuit together with the Pch transistor M1, and is connected to ground at its drain through the resistance element R2 and the Pch transistor M3. The Pch transistor M4 forms a current mirror circuit together with the Pch transistor M1, and is connected to ground at its drain through the Pch transistor M5. The Pch transistor M6 forms a current mirror circuit together with the Pch transistor M1, and is connected to ground at its drain through the Pch transistor M7.

The Pch transistor M3 is connected to one end of the resistance element R2 at its source, and to ground at its drain, and its gate is provided with the alternating current signal Sa. The other end of the resistance element R2 is connected to the drain of the Pch transistor M2. The Pch transistors M5 and M7 are connected to ground at their gates and drains, and are connected to the drains of the Pch transistors M4 and M6 respectively at their sources.

In the voltage generation circuit 14a having the above-described configuration, the Pch transistors M2, M4 and M6 function as current source circuits that supply current to the Pch transistors M3, M5 and M7, respectively. The current source circuits supply each of the Pch transistors M3 and M7 with current larger than (for example, twice as large as) that for the Pch transistor M5, and the currents supplied to the Pch transistors M3 and M7 are equal in amount.

The switching circuit 16a includes Nch transistors M8 and M10, Pch transistors M9 and M11, and an inverter circuit INV. The Nch transistor M8 and the Pch transistor M9 form a transfer gate, and are turned on when the control signal S0 is in high level, so that a signal Sb from the drain of the Pch transistor M2 is provided to a non-inverting (+) terminal of the comparator CMP. Moreover, the Nch transistor M10 and the Pch transistor M11 form a transfer gate, and are turned on when the control signal S0 is in low level, so that a signal Sc from the drain of the Pch transistor M4 is provided to a non-inverting (+) terminal of the comparator CMP. Furthermore, the drain of the Pch transistor M6 is constantly connected to an inverting (−) terminal of the comparator CMP. Thereby, the reverse current detection signal S1 is outputted from an output terminal of the comparator CMP.

Figure 3:
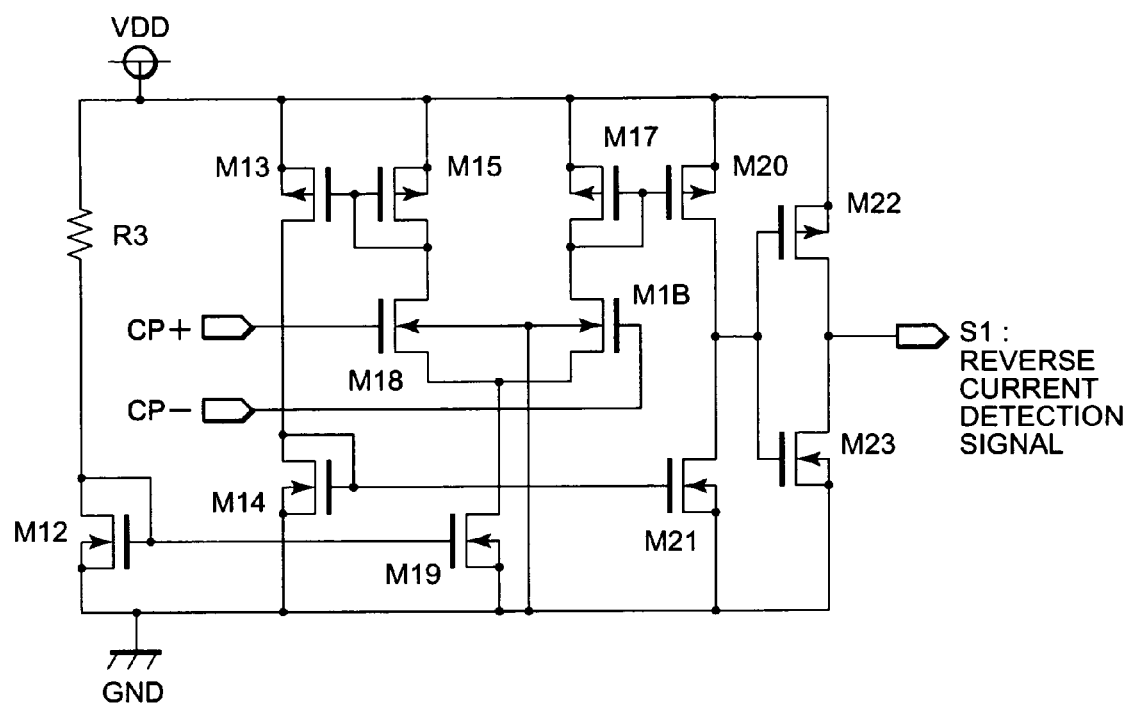
FIG. 3 is a circuit diagram showing an example of a comparator.

FIG. 3 is a circuit diagram showing an example of the comparator CMP. The comparator CMP includes Pch transistors M13, M15, M17, M20 and M22, Nch transistors M12, M14, M16, M18, M19, M21 and M23, and a resistance element R3. The Nch transistors M16 and M18 are connected respectively to the non-inverting (+) terminal and the inverting (−) terminal at their gates, and form a differential pair in the input stage. The diode-connected Nch transistor M12 is connected to the power supply VDD at its drain through the resistance element R3, and forms a current mirror circuit together with the Nch transistor M19. The Nch transistor M19 functions as a current source of the Nch transistors M16 and M18, which are the differential pair.

The Pch transistor M15, which forms a current mirror circuit together with the Pch transistor M13, is connected, as a load, to the drain of the Nch transistor M16. The Pch transistor M17, which forms a current mirror circuit together with the Pch transistor M20, is connected, as a load, to the drain of the Nch transistor M18. The Nch transistor M14, which forms a current mirror circuit together with the Nch transistor M21, is connected, as a load, to the drain of the Pch transistor M13. The Pch transistor M20 and the Nch transistor M21 form an inverting amplifier, and its output terminal outputs the reverse current detection signal S1 through the Pch transistor M22 and the Nch transistor M23, which form an inverting amplifier.

The comparator CMP having the above-described configuration compares a voltage of a signal CP+ from the non-inverting (+) terminal (a first comparison input terminal) and a voltage of a signal CP− from the inverting (−) terminal (a second comparison input terminal), and then outputs the reverse current detection signal S1 indicating the comparison result.

The reverse current prevention circuit 10a having the above-described configuration includes the comparator CMP that compares the alternating current voltage Sa with a threshold voltage, in a period when the rectifier power transistor N1 is to be on. Thereby, the reverse current prevention circuit 10a operates as follows. First, the reverse current prevention circuit 10a applies, to the comparison input terminal of the comparator CMP, a predetermined voltage instead of the alternating current voltage Sa, at least immediately before the period in which the rectifier power transistor N1 is to be on. Note that the predetermined voltage applied here is lower than the threshold voltage. Then, when the comparator CMP judges that the alternating current voltage Sa has exceeded the threshold voltage, in the period when the rectifier power transistor N1 is to be on, the reverse current prevention circuit 10a performs control such that the rectifier power transistor N1 can be turned off.

Furthermore, when the comparator CMP judges that the voltage of the alternating current signal Sa has increased (in the direction toward the midpoint potential) to exceed the threshold voltage, the reverse current prevention circuit 10a may operate as follows. Specifically, the reverse current prevention circuit 10a may switch, to the predetermined voltage, the alternating current voltage Sa to be applied to the comparison input terminal of the comparator CMP, and may perform control such that the thus-switched state can be maintained until immediately before the period in which the synchronous rectifier transistor N1 is to be on.

The voltage generation circuit 14a generates a first comparison voltage (signal Sb) based on the voltage of the alternating current signal Sa, and a second comparison voltage (signal Sc) corresponding to the second potential, and also generates a third comparison voltage (signal CP–) corresponding to the second potential, thereby applying the third comparison voltage to the second comparison input terminal (–terminal of the comparator CMP). The switching circuit 16a selects one of the first and second comparison voltages, and then applies the selected comparison voltage to the first comparison input terminal (+ terminal of the comparator CMP).

The logical circuit, includes the flip-flop circuit FF and the 2 input AND circuit AND, outputs the control signal S0 (a switching signal) to the gate of the synchronous rectifier transistor N1 and the switching circuit 16a. The synchronous rectifier transistor N1 is turned on in response to the control signal CNT2 indicating a period in which the synchronous rectifier transistor N 1 is to be on, and is turned off in response to the reverse current detection signal S1.

Figure 4:
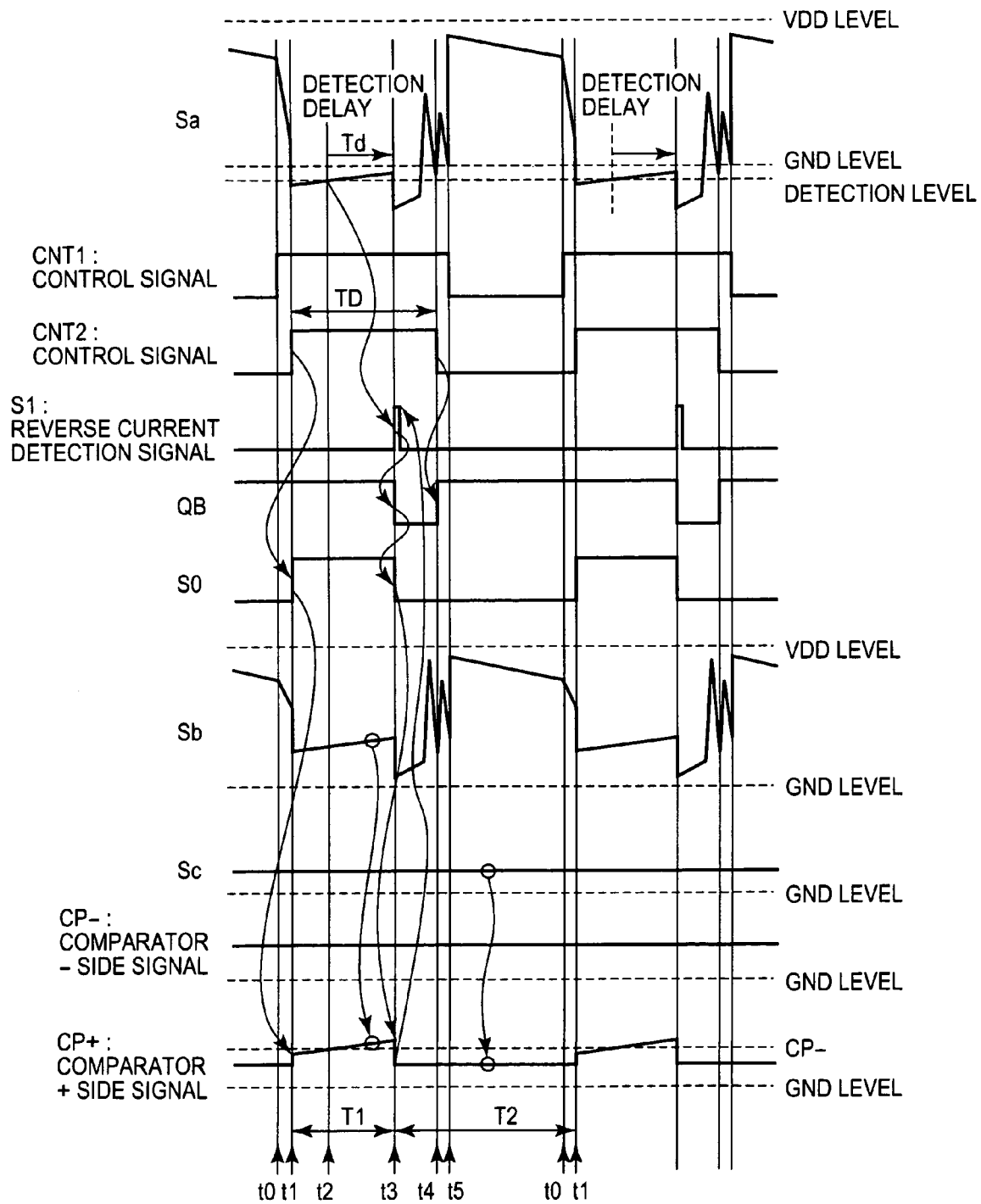
FIG. 4 is a timing chart showing waveforms of the units of the switching regulator according to the first example of the present invention.

Next, operation of each of the units of the switching regulator will be described. FIG. 4 is a timing chart showing waveforms of the units of the switching regulator according to the first example.

Before Time t0, the control signal CNT1 is in low level, and thus the switching transistor P1 is in the ON state. Accordingly, power is supplied from the power source VDD to the load Z through the switching transistor P1 in the ON state.

At Time t0, the control signal CNT1 rises to turn off the switching transistor P1, thereby stopping the power supply from the power supply VDD to the load Z. As a result, the voltage of the alternating current signal Sa decreases rapidly.

At Time t1, with a small time lag after Time t0, the control signal CNT2 rises to set, to high level, the control signal S0, which is an output from the 2 input AND circuit AND. Consequently, the synchronous rectifier transistor N1 is turned on, and hence, current flows from ground to the inductor L. In addition, the voltage of the alternating current signal Sa falls below a detection level which is lower than the GND (ground) level. Moreover, the Nch transistor M8 and the Pch transistor M9, which form a transfer gate, are turned on, so that the signal Sb from the drain of the Pch transistor M2 is provided to the non-inverting (+) terminal of the comparator CMP. Incidentally, the short time lags between Time t0 and Time t1 as well as between Time t4 and Time t5 are provided for preventing the switching transistor P1 and the synchronous rectifier transistor N1 from being in an ON state at the same time.

After Time t1, the current flowing through the inductor L is consumed by the load Z, and hence, the current value decreases. Accordingly, the voltage of the alternating signal Sa increases toward the GND (ground) level. Then, at Time t2, the voltage of the alternating current signal Sa exceeds the detection level. Specifically, in the comparator CMP, the voltage of a comparator + side signal CP+ (here, the signal Sb) exceeds the voltage of a comparator + side signal CP–. The comparator + side signal CP+ is obtained by adding, to the voltage of the alternating current signal Sa, the voltage equivalent to the amount of voltage drop in the Pch transistor M3 and the resistance element R2, and the comparator + side signal CP– is obtained by adding, to the GND level, the voltage equivalent to the amount of voltage drop in the Pch transistor M7.

As mentioned above as a problem, in the comparator CMP, there is a detection delay in outputting a comparison result. Accordingly, the comparator CMP switches the level of the reverse current detection signal S1 to high level at Time t3, with a detection delay Td after Time t2. When the reverse current detection signal S1 becomes high level, a clock input terminal CLK of the flip-flop circuit also becomes high level. Since the clock input terminal CLK becomes high level, the flip-flop circuit FF, which is connected to the power supply VDD at its data input terminal DATA (i.e. the data input terminal DATA is in high level) switches the output terminal QB to low level. Consequently, the control signal S0 becomes low level. As a result, the synchronous rectifier transistor N1 is turned off to stop the current flowing into the inductor L. In sum, even in a case where the comparator CMP involves the detection delay Td, the synchronous rectifier transistor N1 can be turned off before the voltage of the alternating current signal Sa exceeds the GND level, by setting the detection level at a level lower than the GND level by a predetermined amount. Thereby, it is possible to prevent reverse current from flowing into the synchronous rectifier transistor N1.

At Time t3, the control signal S0 becomes low level, and consequently, the Nch transistor M10 and the Pch transistor M11, which form a transfer gate, are turned on. Accordingly, the signal Sc from the source of the Pch transistor M5 is provided to the non-inverting (+) terminal of the comparator CMP. Since the voltage of the comparator + side signal CP+ (here, here the signal Sc) falls below the voltage of the comparator + side signal CP– by a certain value, the comparator CMP switches the level of the reverse current detection signal S1 to low level.

In the time period from this point to Time t1, the voltage of the comparator +side signal CP+ (here, the signal Sc) continues to be a voltage lower than the voltage of the comparator + side signal CP– by the certain value, and hence, the comparator CMP stably keeps the reverse current detection signal S1 at low level.

After Time t3 until Time t5 when the control signal CNT1 falls and the switching transistor P1 is turned on, the switching transistor P1 and the synchronous rectifier transistor N1 are in a OFF state. Accordingly, the alternating current signal Sa has an oscillatory waveform that is generated by a resonant circuit comprised of stray capacitance, the inductor L and the like. The comparator CMP stably keeps the reverse current detection signal S1 at low level, and hence, the level of the reverse current detection signal S1 is not affected even though the alternating current signal Sa has an oscillatory waveform.

At Time t4, the control signal CNT2 falls, and the flip-flop circuit FF switches the level of the output terminal QB to high level.

In the above-described timing chart, a time period T0 from Time t1 to Time t4 corresponds to the period in which the synchronous rectifier transistor (rectifier power transistor) N1 is to be on. Moreover, a time period T1 from Time t1 to Time t3 corresponds to the time in which the synchronous rectifier transistor (rectifier power transistor) N1 is on, while a time period T2 from Time t3 to Time t1 corresponds to the period in which the synchronous rectifier transistor (rectifier power transistor) N is off.

In the switching regulator that performs the above-described operations, the comparator – side signal CP– is constantly inputted into the inverting (–) terminal of the comparator CMP. The comparator – side signal CP– has a voltage with a level shifted from the GND level by the Pch transistor M7 forming a source follower. Moreover, the signal Sb is inputted into the non-inverting (+) terminal of the comparator CMP in the time period T1. The signal Sb has a voltage with a level shifted from the alternating current signal Sa by the resistance element R2 and the Pch transistor M3 forming a source follower. Here, the voltage generated by both constant current from the Pch transistor M2, which is a current source, and the resistance element R2 is to be a voltage that is enough to compensate for detection delay of the comparator CMP, and a concrete example of such voltage can be the voltage of approximately 10 mV. In the case where the voltage generated by the constant current and the resistance element R2 is 10 mV, the voltage of the alternating signal Sa results in being equal to the GND level when the voltage is set lower than the GND level by 10 mV. Accordingly, the detection level is to be potential corresponding to −10 mV.

When the voltage of the alternating current signal Sa becomes higher than −10 mV, which is the detection level, in the time period T0 when the control signal CNT2 is in high level, the reverse current detection signal S1 becomes high level with detection delay Td, and the output terminal QB becomes in low level. Thereby, the synchronous transistor N1 is turned off.

In the time period T2 when the synchronous transistor N1 is off, the switching circuit 16a inputs the signal Sc, which is to be reference voltage, into the non-inverting (+) terminal of the comparator CMP. Here, the reference voltage is set at voltage which is lower than the detection voltage (−10 mV), and which can certainly set the output from the comparator CMP to be in low level. A concrete example of such voltage is approximately −50 mV. In the time period T2, the voltage of the non-inverting (+) terminal of the comparator CMP is lower than the voltage of the inverting (−) terminal (reference voltage −50 mV<detection voltage −10 mV), and the output of the comparator CMP is certainly reset to be in low level.

With the switching regulator that performs the above-described operations, the synchronous rectifier transistor N1 can certainly be turned off even in a case where the comparator CMP has a dead zone width making the comparator CMP unable to perform comparison operation with high accuracy under light load conditions. Hence, efficiency in power conversion under light load conditions can be improved.

Moreover, the voltages with levels respectively shifted by the Pch transistors M3, M5 and M7, each of which has a source follower configuration, are inputted into the comparator CMP. With such a circuit configuration, an Nch transistor can be used for a differential pair in the input stage of the comparator CMP even when the voltage of the alternating current signal Sa that is the target of monitoring is extremely small, near 0V. The comparator CMP using an Nch transistor for the differential pair in the input stage is generally capable of carrying out comparison judgment at high speed.

Furthermore, voltage for compensating for the detection delay in the comparator CMP is generated on the basis of output current of the Pch transistor M2 and the resistance value of the resistance element R2. Accordingly, detection voltage can be generated with high accuracy. In addition, by employing the same material for the resistance element R2 and the resistance element R1, which is provided to generate current, in the current source circuits, voltage drifts due to the temperature characteristic of the resistance values can be canceled out, and hence, accuracy in detecting voltage can be improved against temperature fluctuation.

Reference voltage used for resetting the reverse current signal S1, which is the output of the comparator CMP, to low level can be set appropriately by choosing a current value of the output current of each current source circuit and the size of each Pch transistor having a source follower configuration. Moreover, the reference voltage is determined relative to the voltage that reaches a detection level. Accordingly, reference voltage that is capable of accurately resetting the reverse current detection signal S1 to low level, and that does not depend on the absolute accuracy of an element, can be generated.

In addition, in the time period T2, when the load current is extremely small, the alternating current signal Sa has an oscillatory waveform that is generated by a resonant circuit comprised of stray capacitance, the inductor L and the like. Moreover, the alternating current signal Sa is also set at high level by the switching transistor P1 in an ON state. In the time period T2, the comparator CMP stably outputs the reverse current detection signal S1 in low level. This demonstrates that the comparison operation is not affected even when the alternating current signal Sa varies a great deal in the level.

Example 2

Figure 5:
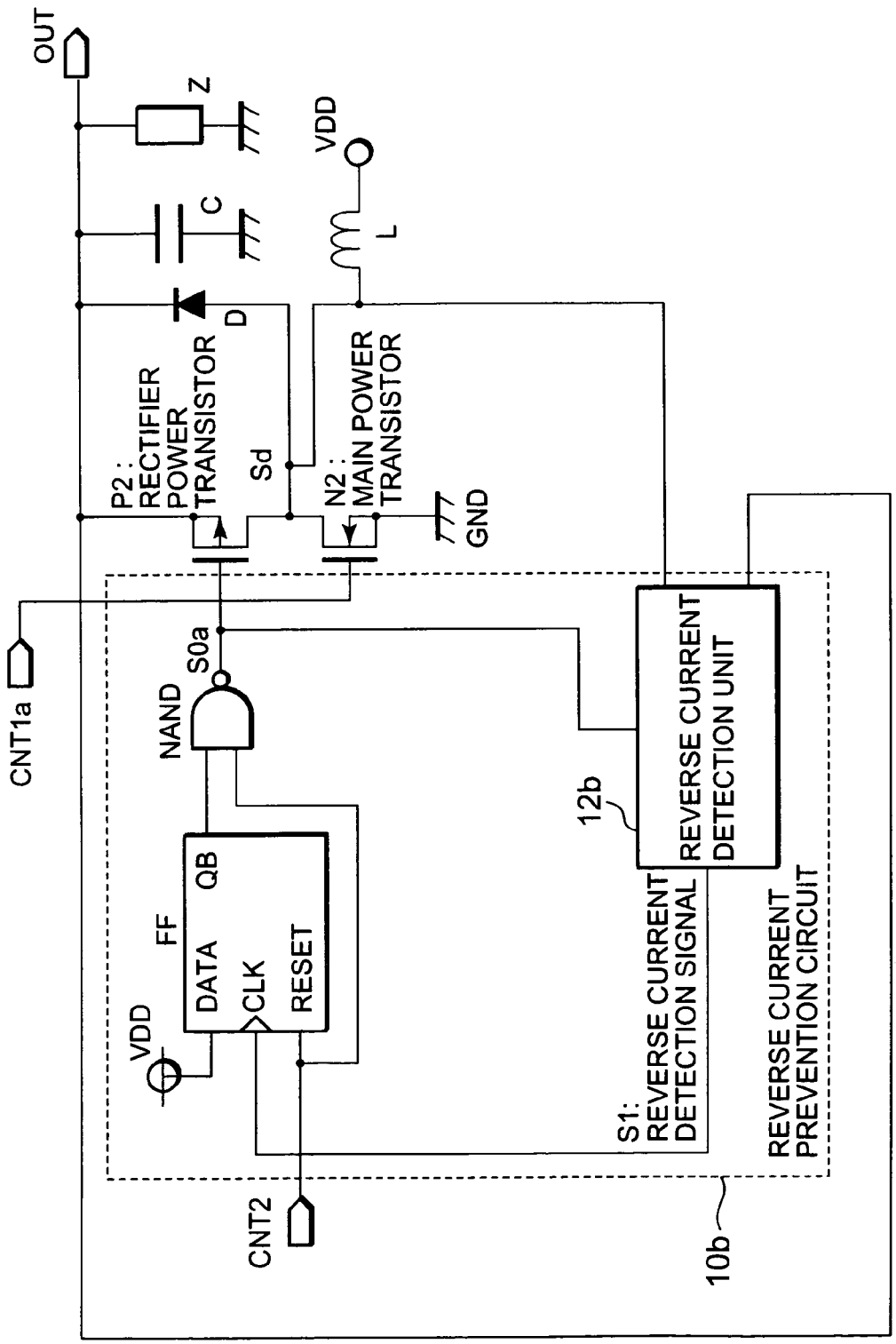
FIG. 5 is a block diagram showing a configuration of a switching regulator according to a second example of the present invention.

FIG. 5 is a block diagram showing a configuration of a switching regulator according to a second example of the present invention. In FIG. 5, the same symbols as those used in FIG. 1 are used for denoting the same constituents. The switching regulator in FIG. 5 includes a switching transistor (main power transistor) N2, a synchronous rectifier transistor (rectifier power transistor) P2, a reverse current prevention circuit 10b, a diode D, the inductor L, and the capacitor C. The switching regulator steps up the voltage from the power source VDD to apply the resultant voltage to the load Z connected to the output terminal OUT.

The switching transistor N2 is connected to ground at its source, and to one end of the inductor L at its drain, and the gate of the switching transistor N2 is provided with a pulse-width or pulse-density modulated control signal CNT1a for controlling output voltage to the load Z.

The synchronous rectifier transistor P2 is connected, at its source, to the output terminal OUT, the cathode of the diode D, one end of the capacitor C, and one end of the load Z, and is connected, at its drain, to the one end of the inductor L and the anode of the diode D. Moreover, the synchronous rectifier transistor P2 is connected, at its gate, to the reverse current prevention circuit 10b, which performs control, by detecting reverse current in the inductor L, to turn on or off the synchronous rectifier transistor P2.

The other end of the inductor L is connected to the power supply VDD, and the other ends of the capacitor C and the load Z are connected to ground.

The switching transistor N2 and the synchronous rectifier transistor P2 convert the voltage from the power supply VDD to the voltage of the voltage of an alternating current signal Sd. The alternating current signal Sd is smoothed by the inductor L and the capacitor C, and is then provided, as direct current voltage, to the load Z.

The reverse current prevention circuit 10b includes a reverse current detection unit 12b, the flip-flop circuit FF, a 2-input NAND circuit NAND. The reverse current detection unit 12b receives, as inputs, the alternating current signal Sd and a control signal S0a for the gate of the synchronous rectifier transistor P2, and then outputs the reverse current detection signal S1 to the clock input terminal CLK of the flip-flop circuit FF. In the flip-flop circuit FF, the data input terminal DATA is connected to the power supply VDD, the reset terminal RESETB receives an input of the control CNT2 synchronized with the control signal CNT1a, and the output terminal QB is connected to one of the input terminals of the 2-input NAND circuit NAND. The 2-input AND circuit NAND receives an input of the control signal CNT2 at the other input terminal, and then outputs the control signal S0a from the output terminal to the gate of the synchronous rectifier transistor P2 and the reverse current detection unit 12b.

Figure 6:
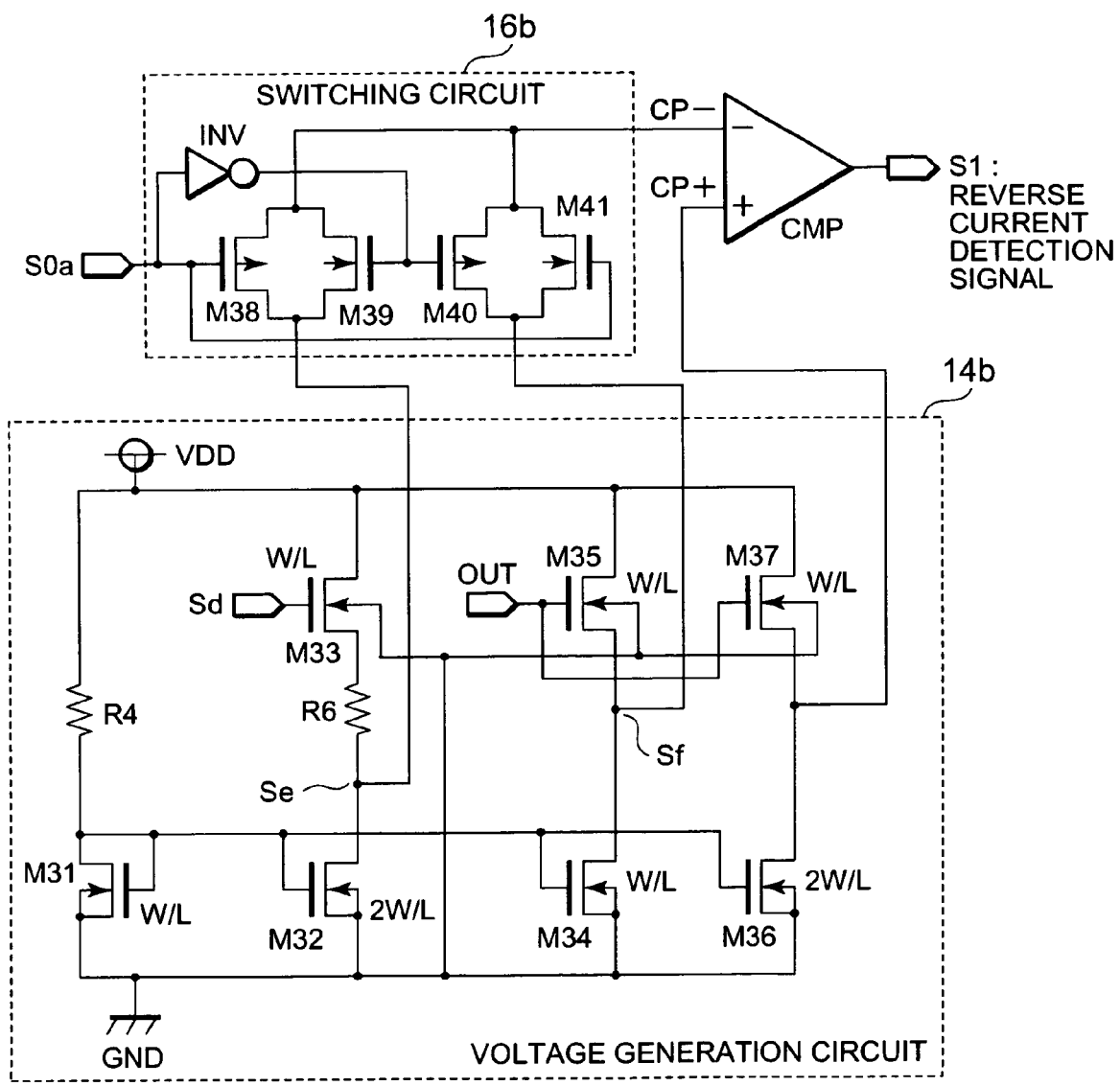
FIG. 6 is a circuit diagram showing an example of a reverse current detection unit according to the second example of the present invention.
Figure 8A:
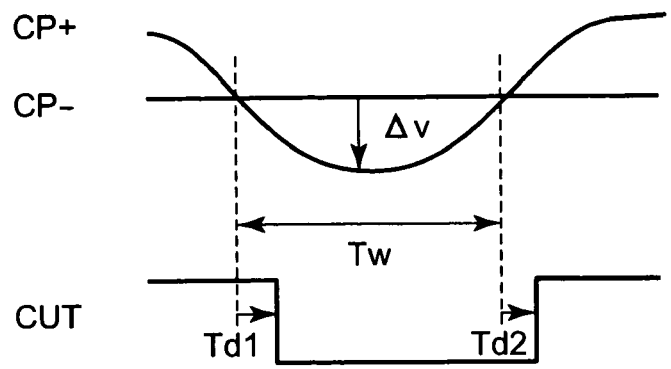
FIGS. 8A to 8C are charts schematically showing operation waveforms of a comparator.
Figure 8B:
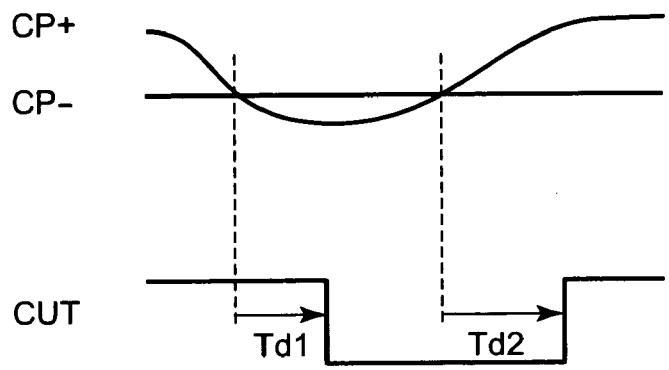
Figure 8C:
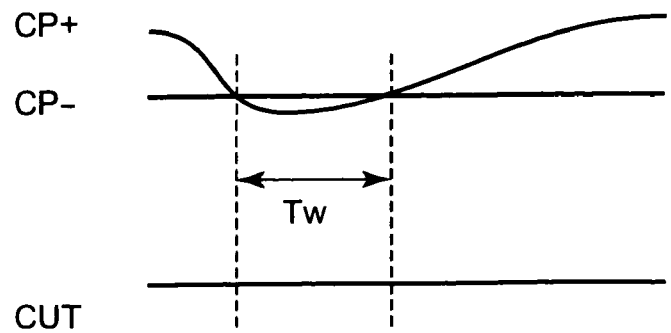

Next, the reverse current detection unit 12b will be described in detail. FIG. 6 is a circuit diagram showing an example of the reverse current detection unit 12b. The reverse current detection unit 12b includes the comparator CMP, a voltage generation circuit 14b, and the switching circuit 16b.

The voltage generation circuit 14b includes Nch transistors M31 to M37, and resistance elements R4 and R5. In the voltage generation circuit 14b, the sizes (W/L) of the Nch transistors M31, M33 to M35, and M37 are identical, while the size (2W/L) of each of the Nch transistors M32 and M36 is twice as large as that of the Nch transistors M31, M33 to M35, and M37.

The Nch transistor M31 is connected to ground at its source, and to the power source VDD at its diode-connected drain through the resistance element R4. The Nch transistor M32 forms a current mirror circuit together with the Nch transistor M31, and is connected to the power supply VDD at its drain through the resistance element R5 and the Nch transistor M33. The Nch transistor M34 forms a current mirror circuit together with the Nch transistor M31, and is connected to the power supply VDD at its drain through the Nch transistor M35. The Nch transistor M36 forms a current mirror circuit together with the Nch transistor M31, and is connected to the power supply VDD at its drain through the Nch transistor M37.

The Nch transistor M33 is connected to one end of the resistance element R5 at its source, and to the power supply VDD at its drain. The gate of the Nch transistor M33 is provided with the alternating current signal Sd. The Nch transistors M35 and M37 are connected to the power supply VDD at their gates and drains, and to the drains of the M35 and M37 respectively at their sources.

The switching circuit 16b includes Nch transistors M39 and M41, Pch transistors M38 and M40, and the inverter circuit INV. The Pch transistor M38 and the Nch transistor M39 form a transfer gate, and are turned on, when the control signal S0a is low level, to provide a signal Se from the drain of the Nch transistor M32 to the inverting (−) terminal of the comparator CMP. The Pch transistor M40 and the Nch transistor M41 form a transfer gate, and are turned on, when the control signal S0a is high level, to provide a signal Sf from the drain of the Nch transistor M34 to the inverting (−) terminal of the comparator CMP. The Nch transistor M36 is connected to the non-inverting (+) terminal of the comparator CMP at its drain. The reverse current detection signal S1 is outputted from the output terminal of the comparator CMP.

The reverse current prevention circuit 10b having the above-described configuration includes the comparator CMP that compares the alternating voltage Sd with a threshold voltage, in a period when the rectifier power transistor P2 is to be on. Thereby, the reverse current prevention circuit 10b operates as follows. First, the reverse current prevention circuit 10b applies, to the comparison input terminal of the comparator CMP, a predetermined voltage instead of the alternating current voltage Sd, at least immediately before the period in which the rectifier power transistor P2 is to be on. Note that the predetermined voltage applied here is higher than the threshold voltage. Then, when the comparator CMP judges that the alternating current voltage Sd has fallen below the threshold voltage, in a period when the rectifier power transistor P2 is on, the reverse current prevention circuit 10b performs control such that the rectifier power transistor P2 can be turned off.

Furthermore, when the comparator CMP judges that the voltage of the alternating current signal Sd has decreased (in the direction toward the midpoint potential) to fall below the threshold value, the reverse current prevention circuit 10b may operate as follows. Specifically, the reverse current prevention circuit 10b may switch, to a predetermined voltage, the alternating current voltage Sb to be applied to the comparison input terminal of the comparator CMP, and may perform control such that the thus-switched state can be maintained until immediately before a period in which the synchronous rectifier transistor P2 is to be on.

Next, operation of each of the units of the switching regulator will be described. FIG. 7 is a timing chart showing waveforms of the units of the switching regulator according to the second example. The followings are characteristics in FIG. 7 that are different from those in FIG. 4.

(1) The alternating current signal Sd has a waveform that is the inversion of the waveform of the alternating current signal Sa. Moreover, the detection level is set higher than the OUT level in the comparator CMP.

(2) The control signal CNT1a has a logical level that is the inversion of the control CNT1.

(3) The control signal S0a has a logical level that is the inversion of the control signal S0.

(4) The signal Se has a waveform that is the inversion of the waveform of the signal Sb.

(5) The signal Sf is set slightly lower than the potential level of the power supply VDD.

(6) The comparator CMP detects that the comparator − side signal CP− (the signal Se, here) has fallen below the comparator + side signal CP+, in the time period T1. Moreover, the comparator − side signal CP− (the signal Sf, here) is fixed at a level higher than that of the comparator − side CP+.

Since the switching regulator according to the second example is a step-up type, some of the signal levels of the switching regulator are different from the corresponding signal levels of the switching regulator according to the first example. However, the fundamental operations are same as those of the first example, and the same effects as those of the first example are brought about.

It should be noted that the disclosure of the above-mentioned patent documents are included in this specification by reference. Changes and adjustments can be made to the embodiment and the examples within the entire disclosure (including the scope of claims) of the present invention on the basis of the fundamental technical ideas. Moreover, a wide variety of combinations of, and selections from, the various disclosed components are possible within the scope of the present invention. In other words, it is obvious that the present invention includes various changes and modifications possible to be made by those skilled in the art on the basis of the entire disclosure including the scope of the claims and the technical ideas.

Further, it is noted that, Applicant's intent is to encompass equivalents of all claim elements, even if amended later during prosecution.

What is claimed is:

1. A switching regulator, comprising:
   first and second transistors which are provided in series between power sources respectively having first and second potentials, and which convert a direct current voltage of a potential difference between the first and the second potentials into an alternating current voltage; and
   a control circuit including:
      a comparator which compares the alternating current voltage and a threshold voltage in a period when the second transistor is to be on, and receives a predetermined voltage different from the alternating current voltage, at least immediately before the period in which the second transistor is to be on, the predetermined voltage being farther than a midpoint potential of the first and second potentials from the threshold voltage, wherein the control circuit performs control such that the second transistor becomes turned off, when the comparator judges that the alternating current voltage has exceeded the threshold voltage toward the midpoint potential direction, the control circuit switches to apply from the alternating current voltage to the predetermined voltage into the comparator, and then performs control such that the switched state is maintained until immediately before the period in which the second transistor is to be on.

2. The switching regulator according to claim 1, wherein:
the comparator includes first and second comparison input terminals and outputs a reverse current detection signal, and
the control circuit further includes:
a voltage generation circuit which generates a first comparison voltage based on the alternating current voltage, and a second comparison voltage corresponding to the second potential, the second comparison voltage being the predetermined voltage, and which also generates the threshold voltage corresponding to the second potential, thereby applying the threshold voltage to the second comparison input terminal;
a switching circuit which selects one of the first and second comparison voltages, and which applies a selected voltage to the first comparison input terminal; and
a logical circuit which outputs, to a gate of the second transistor and the switching circuit, a switching signal for controlling the second transistor, the second transistor being controlled to be turned on in response to a control signal indicating a period in which the second transistor is to be on, and to be turned off in response to the reverse current detection signal.

3. The switching regulator according to claim 2, wherein:
the voltage generation circuit includes:
a first resistance element;
a first MOS transistor which receives the second potential at its drain, which is connected to a first switching terminal of the switching circuit at its source through the first resistance element, and which receives the alternating current voltage to its gate;
a second MOS transistor which receives the second potential at its drain and gate, and which is connected to a second switching terminal of the switching circuit at its source;
a third MOS transistor which receives the second potential at its drain and gate, and which is connected to the second comparison input terminal of the comparator at its source; and
a current source circuit which supplies a current to the source of the first MOS transistor through the first resistance element, and supplies said the current to the source of each of the second and third MOS transistors, and the current source circuit supplies each of the first and third MOS transistors with current larger than that to be supplied to the second MOS transistor, and which supplies the first and third MOS transistors respectively with currents of the same amount.

4. The switching regulator according to claim 3, wherein:
the current source circuit includes first, second and third current mirror circuits, the first current mirror circuit using a second resistance element as a load; and
the first, second and third current mirror circuits supply current to the first, second, and third MOS transistors, respectively.

5. The switching regulator according to claim 1, wherein the switching regulator comprises a step-down type switching regulator or a step-up type switching regulator.

6. A switching regulator, comprising:
a power transistor including a node for being coupled to an inductor;
a reverse current detector which detects a state of said node and outputs a detection signal; and
a control circuit which receives said detection signal and a first control signal including a first level and a second level following said first level, said first level having a first period and a second period following said first period, said first period of said first level corresponding to a condition where said power transistor is in an on state, said second period of said first level corresponding to a condition where said power transistor is in an off state, and said second level corresponding to a condition where said power transistor is in said off state,
wherein said reverse current detector comprises:
a switch circuit which selectively outputs one of a first signal corresponding to said state of said node and a second signal different from said first signal, in response to a second control signal obtained from said first control signal and said detection signal;
a comparator which includes a first input terminal receiving a selected signal of said first and second signals, a second input terminal receiving a reference signal, and an output terminal outputting said detection signal.

7. The switching regulator as claimed in claim 6, said reverse current detector further comprising:
a voltage generator including:
a first level shift circuit which produces said first signal obtained by shifting a voltage potential of said state of said node;
a second level shift circuit which produces said second signal obtained by shifting a power source voltage potential; and
a third level shift circuit which produces said reference signal obtained by shifting said power source voltage potential.

8. The switching regulator as claimed in claim 7, further comprising:
a second power transistor coupled between said node and a power source terminal and receiving a third control signal different from said first control signal.

9. A switching regulator, comprising:
a control circuit which is responsive to a detection signal and a first control signal to output a second control signal, said first control signal having a first voltage potential width defined by a first edge and a second edge thereof, said second control signal having a second voltage potential width defined by a first edge and a second edge thereof, said first edge of said second control signal corresponding to said first edge of said first control signal, said second voltage potential width being narrower than said first voltage potential width, said second edge of said second control signal corresponding to said detection signal;

a power transistor including a node for being coupled to an inductor and a control gate receiving said second control signal; and a reverse current detector which is responsive to a state of said node and said second control signal to produce said detection signal, said reverse current detector comprising:

a voltage generator including:

a first level shift circuit which produces a first signal obtained by shifting a voltage potential of a state of said node;

a second level shift circuit which produces a second signal obtained by shifting a power source voltage potential; and a third level shift circuit which produces a reference signal obtained by shifting said power source voltage potential; and a comparator including a first input terminal which receives one of said first signal and said second signal thereto and a second input terminal which receives said reference signal thereto.

* * * * *